(12) United States Patent
D'Haene et al.

(10) Patent No.: US 7,960,503 B2
(45) Date of Patent: Jun. 14, 2011

(54) CONTINUOUS WASHING OF POLY(VINYL BUTYRAL)

(75) Inventors: Pol D'Haene, Kessel-Lo (BE); Nandan Ukidwe, Worcester, MA (US); Paul Van Lierde, Haacht (BE)

(73) Assignee: Solutia, Inc., St. Louis, MO (US)

( * ) Notice: Subject to any disclaimer, the term of this patent is extended or adjusted under 35 U.S.C. 154(b) by 86 days.

(21) Appl. No.: 12/472,353

(22) Filed: May 26, 2009

(65) Prior Publication Data

US 2010/0305290 A1 Dec. 2, 2010

(51) Int. Cl.
*C08F 6/00* (2006.01)
*C08G 64/00* (2006.01)

(52) U.S. Cl. ........ 528/499; 428/426; 428/428; 428/437; 524/32; 524/377; 524/390; 524/403; 524/405

(58) Field of Classification Search ................... 428/426, 428/428, 437; 524/32, 377, 390, 403, 405; 528/499
See application file for complete search history.

(56) References Cited

U.S. PATENT DOCUMENTS

| | | | |
|---|---|---|---|
| 2,282,026 A | 5/1942 | Bren et al. |
| 2,282,057 A | 5/1942 | Hopkins et al. |
| 2,422,754 A | 6/1947 | Stamatoff |
| 2,720,501 A | 10/1955 | Van Ness |
| 3,153,009 A | 10/1964 | Rombach |
| 3,841,890 A | 10/1974 | Coaker et al. |
| 4,144,217 A | 3/1979 | Snelgrove et al. |
| 4,654,179 A | 3/1987 | Cartier et al. |
| 4,814,529 A | 3/1989 | Cartier et al. |
| 4,874,814 A | 10/1989 | Cartier et al. |
| 4,902,464 A | 2/1990 | Cartier et al. |
| 5,013,779 A | 5/1991 | Fariss et al. |
| 5,238,994 A | 8/1993 | Reejhsinghani |
| 5,594,069 A | 1/1997 | David et al. |
| 5,728,472 A | 3/1998 | D'Errico |
| 5,866,654 A | 2/1999 | Fuss |
| 6,528,025 B1 | 3/2003 | Boesch |
| 7,351,765 B2 | 4/2008 | Stark |
| 7,385,005 B2 | 6/2008 | Mashiko |
| 7,491,761 B2 | 2/2009 | Chen et al. |
| 2008/0111954 A1 | 5/2008 | Hashimoto |
| 2008/0139803 A1 | 6/2008 | Sasada |

FOREIGN PATENT DOCUMENTS

| JP | 5-097918 A | 4/1993 |
|---|---|---|
| JP | 5-155916 | * 6/1993 |

OTHER PUBLICATIONS

Vinyl Acetal Polymers, in Encyclopedia of Polymer Science & Technology, 3$^{rd}$ edition, vol. 8, pp. 381-399 by B.E. Wade (2003).
A.E. Akopyan, V.E. Badalyn, and D.Kh. Sarkisyan, Continuous Process for Production of Adhesive Polyvinyl Butyral, Zh. Prikl. Khim., 1964, 37, 7, 1601-5, S. Petersburg, Russ, Fe.
A.E. Akopyan, V.E. Badalyn, and D.Kh. Sarkisyan, Continuous Washing of Polyvinyl Butyral, Armyansk Khim Zh., 1966, 19, 4, 32-15.
Romankov, P.G., Rashkovskaya, N.B., Sinel'Nikova, L.L., Drying of Polymers in a Fluidized Bed and y the Air-Blow Method, Khim. Prom., (1963), (11),841-3 (English Abstract).

* cited by examiner

*Primary Examiner* — Terressa M Boykin
(74) *Attorney, Agent, or Firm* — Lewis, Rice & Fingersh, L.C.

(57) ABSTRACT

The present invention provides a method for continuously washing poly(vinyl butyral) in which a poly(vinyl butyral) slurry is passed through multiple continuous stirred tank reactors, each of which is adjusted to specific processing parameters that allow for continuous input, washing, and removal of poly(vinyl butyral). The resulting poly(vinyl butyral) can then be dried to form a powder resin that can be used in place of conventional poly(vinyl butyral) resin. In an alternative embodiment, a counter current screw washing unit is provided that passes wash water over the poly(vinyl butyral) in a direction opposite to the flow of the poly(vinyl butyral), thereby allowing the continuous washing of the poly(vinyl butyral) resin.

22 Claims, 2 Drawing Sheets

CONTINUOUS WASHING OF POLY(VINYL BUTYRAL)

FIELD OF THE INVENTION

The present invention is in the field of poly(vinyl butyral) production, and, specifically, the present invention is in the field of poly(vinyl butyral) production utilizing continuous production techniques.

BACKGROUND

Poly(vinyl butyral) (PVB) is commonly used in the manufacture of polymer sheets that can be used as interlayers in light-transmitting laminates such as safety glass or polymeric laminates. Safety glass often refers to a transparent laminate comprising a poly(vinyl butyral) sheet disposed between two sheets of glass. Safety glass often is used to provide a transparent barrier in architectural and automotive openings. Its main function is to absorb energy, such as that caused by a blow from an object, without allowing penetration through the opening or the dispersion of shards of glass, thus minimizing damage or injury to the objects or persons within an enclosed area.

Poly(vinyl butyral) is commonly produced using a conventional batch process that, like most batch processes, requires repeated cycles of reactant addition, mixing, emptying, and cleaning. One conventional method can require over a four hour batch cycle time.

After poly(vinyl butyral) has been formed, washing of the poly(vinyl butyral) slurry is usually accomplished in a discontinuous wash tank, which is time and space consuming. The limitations of conventional poly(vinyl butyral) washing cause particular inefficiencies when coupled with continuous poly(vinyl butyral) production methods, such as those disclosed in copending application U.S. application Ser. No. 12/426,246. In those processes, the inability to continuously wash the continuously produced poly(vinyl butyral) slurry can result in either the need to stop continuous production or to provide substantial, inefficient storage capacity for the continuously produced poly(vinyl butyral) to allow for a conventional batch washing process to cycle.

Accordingly, further improved methods are needed to produce poly(vinyl butyral) using a continuous washing process that is efficient, scalable, and that produces washed poly(vinyl butyral) of consistently high quality.

SUMMARY OF THE INVENTION

The present invention provides a method for continuously washing poly(vinyl butyral) in which a poly(vinyl butyral) slurry is passed through multiple continuous stirred tank reactors, each of which is adjusted to specific processing parameters that allow for continuous input, washing, and removal of poly(vinyl butyral). The resulting poly(vinyl butyral) can then be dried to form a powder resin that can be used in place of conventional poly(vinyl butyral) resin. In an alternative embodiment, a counter current screw washing unit is provided that passes wash water over the poly(vinyl butyral) in a direction opposite to the flow of the poly(vinyl butyral), thereby allowing the continuous washing of the poly(vinyl butyral) resin.

DETAILED DESCRIPTION

The present invention provides a poly(vinyl butyral) washing process for the continuous washing of poly(vinyl butyral) resin in a slurry.

Conventional washing processes for poly(vinyl butyral), which are batch processes, have a number of serious shortcomings. The most important is a lack of efficiency in removing acids, salts, and unreacted material from the resin. Further, there is a large investment cost associated with the large volume of a batch vessel and the inability to run the equipment in a continuous mode.

The present invention, which, in various embodiments, includes the application of a series of continuously stirred tank reactors (CSTRs) to wash poly(vinyl butyral) resin, addresses many of the aforementioned disadvantages of a conventional batch process. By utilizing continuous and countercurrent transport of both the solid and the liquid phases in a poly(vinyl butyral) slurry, a higher mass transfer efficiency is obtained, and a reduced operating cost from fresh wash water savings is realized. The continuous transport of solids and liquid reduces the required size of the CSTR's by eliminating non-productive steps, such as batch filling and draining.

In another embodiment of the invention, continuous washing is achieved in a screw-type continuous washing device.

Poly(vinyl butyral) resin that has just been formed through the acetalization of poly(vinyl alcohol) typically is in the form of a slurry, with the resin mixed with one or more solvents, which can be water or a non-aqueous solvent, and one or more other components that are typically undesirable at high concentrations, such as acids, metal salts, unreacted materials, and other processing byproducts.

In one embodiment of a continuous washing method of the present invention, multiple continuous stirred tank reactors are provided, and a stream of a poly(vinyl butyral) slurry, which can come directly from a poly(vinyl butyral) production process, is fed into a first continuous stirred tank reactor, in a continuous manner, and then into one or more further CSTRs, which results in a finished poly(vinyl butyral) resin that has been sufficiently washed, and which can then be optionally filtered and then dried to provide a final, dry form of resin.

Figure 1:
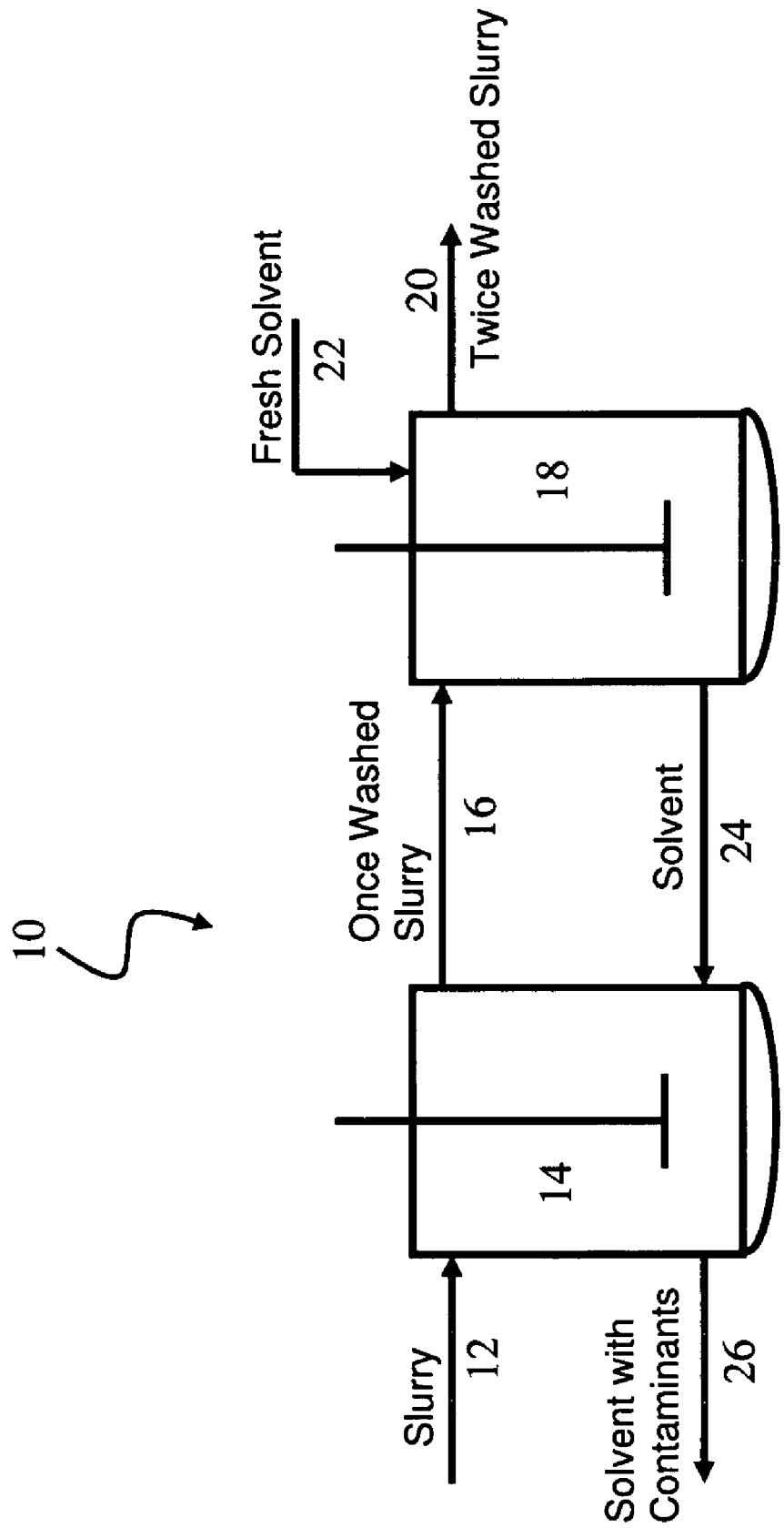
FIG. 1 is a schematic representation of one embodiment of a continuous washing method of the present invention.

This embodiment is shown in FIG. 1 generally at 10. As shown, a slurry is introduced continuously 12 into a first CSTR 14 in which it is mixed with solvent. The slurry is then moved out of the first CSTR 14 as a once washed slurry 16 and moved to a second CSTR 18. The slurry is then moved out of the second CSTR 18 as a twice washed slurry 20 for further processing, which can be further washing in further CSTRs or final drying. As shown in the figure, fresh solvent 22 is introduced and moved through the CSTRs in a counter-current manner, beginning at the last CSTR—in this case CSTR 18—and proceeding to the each CSTR in turn, as shown as moving solvent 24 and a final solvent with contaminants 26 in the figure. The continuous process can be expanded to further CSTRs as described elsewhere herein.

In these embodiments, at least two continuous stirred tank reactors are used in series in which continuous and counter-current transport of both liquid and solid phases is realized. In general, the higher the number of washing vessels, the lower the fresh water requirement, and, in various embodiments, 2 to 15, or 4 to 11 CSTR vessels are used. The processing conditions in the multiple continuous stirred tank reactors can be the same or different.

Countercurrent washing, as used herein, is washing in which the solid and the liquid phases are flowing in opposite directions, which helps to optimize at any instant the driving force for mass transfer of the contaminants.

Any suitable continuous stirred tank reactors can be used, as are known in the art. Continuous stirred tank reactors include stirred tanks with a centered agitator and baffles or stirred tanks with an off-center agitator and no baffles.

Such stirred tanks can be equipped with a filtration device to effect solid-liquid separation. Filtration may be accomplished by one or more screens attached to the bottom or side walls of the tanks, one or more screen barrels installed inside the tank, one or more top-inserted retractable or non-retractable filter socks, or a suitable filter installed in an external loop. Filter cloth itself can comprise any material of construction that is tolerant to the pH of the slurry and that is rated for five microns or less. Screens may or may not be equipped with back-flushing or self-cleansing capability.

In various embodiments, tanks are equipped with inlet ports for slurry and wash liquor, outlet ports for washed slurry and spent wash liquor, and tanks may or may not be equipped with an external jacket.

Flow rates of an incoming poly(vinyl butyral) slurry feed can be any suitable rate that is commensurate with the equipment size. Excessive flow rates can require large vessels and pumps with higher capital costs.

In various embodiments, the incoming solids content can be any concentration ranging from a diluted slurry (0.1% total solids on dry weight basis) to a dry powder, which is then dispersed in the washing liquid in the first CSTR. The dry weight of a slurry is measured by weighing the residue of a sample after the complete evaporation of the liquid phase. In embodiments in which the incoming slurry is pumped into the first CSTR, its concentration can be 0.1% to 30%, 5% to 30%, or 10% to 25% total solids on a dry weight basis.

In embodiments in which the solids concentration is such that the slurry cannot be pumped, the material can be fed into the first CSTR by means of a screw. For partially drained poly(vinyl butyral) slurry (for instance by dewatering the slurry under gravity), the solids concentration can be 25% to 50% or 30% to 40%. A cake with a solids concentration higher than 40% or higher than 50% that is, for instance, obtained after centrifugation or after using a filtration technique (under vacuum or pressure) can also be fed into the vessel by means of a screw.

Fresh wash liquor flow rate is set at a level to achieve desired washing efficiency, and depends on several factors, including flow rate and total solids concentration of slurry feed to the first CSTR, residual acid concentration at the exit of the last CSTR, and number of CSTRs in the setup. For 20 parts per million residual nitrate ion concentration at the exit of the last CSTR, fresh de-ionized water flow rate can be at least 11.4 kg, 8.8 kg, 7.4 kg, 6.5 kg, 5.9 kg, and 5.3 kg, quantified per kg of dry poly(vinyl butyral) powder fed to the first CSTR for respectively 3, 4, 5, 6, 7, and 8 CSTR's in series. These quantities assume a concentration of 1 w/w % of contaminants in the incoming slurry. Slurry and wash liquor flow rates and slurry total solids between CSTRs may or may not vary, but it is preferable to maintain solids fully suspended and the slurry easily transferable.

Stir rates should be such that poly(vinyl butyral) resin particles are kept in constant suspension and splashing in the headspace is minimized. Mechanical power input from agitation are, for example, 1.3 to 2.1 watts/gal.

The temperature range in a CSTR can range between 20° C. and 95° C., and in various embodiments is 40° C. to 90° C., or 60° C. to 80° C. Higher temperatures can cause the poly (vinyl butyral) particles to agglomerate by which the efficiency of the washing process decreases, which necessitates the use of more wash fluid to achieve adequate washing.

The residence time of the poly(vinyl butyral) resin in the CSTR depends on the number of CSTR's present in the entire setup. The total residence time of the poly(vinyl butyral) particles can be 15 minutes to 3 hours or 30 minutes to 1.5 hours. The residence time per CSTR can be identical to the total residence time divided by the number of CSTRs. The residence time does not need to be identical for every CSTR, but can instead vary.

In further embodiments of the present invention, a screw-type continuous washing device is utilized to implement continuous washing of a poly(vinyl butyral) resin slurry. In these embodiments, a washing device comprises a slowly turning screw (auger) that moves a continuous stream of poly(vinyl butyral) resin slurry against a counter current flow of wash fluid, which, as in other embodiments, can be any suitable fluid and is preferably water or a water-based fluid. The screw can, for example, incorporate screen material or can otherwise define openings that are sized so as to allow water or other wash fluid through while not allowing any or substantial amounts of resin to pass, thereby allowing the auger to drive solids in a direction that is counter to the wash fluid flow. In various embodiments, the screw can be drilled or laser cut to provide small holes throughout the screw that function as a screen.

Figure 2:
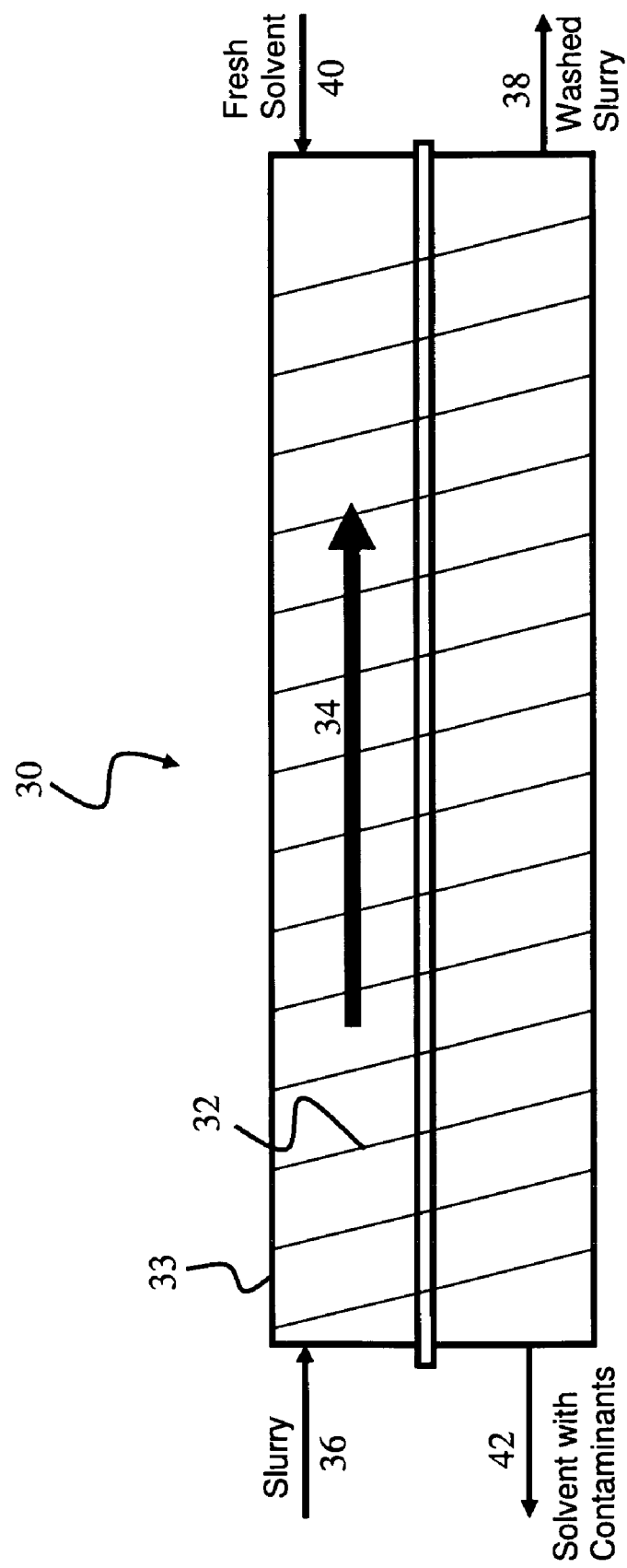
FIG. 2 is a schematic representation of one embodiment of a continuous washing method of the present invention.

This embodiment is shown schematically in FIG. 2. As shown in the figure generally at 30, a screw-type washer includes a screw 32 within a housing 33 or trough (not shown). A slurry 36 in continuously introduced to the washer 30 and is moved in the direction shown 34 by the screw 32. The washed slurry 38 is then removed from the washer 30. Fresh solvent 40 is introduced and moved through the washer 30 in a counter-current manner, and is then removed as a solvent with contaminants 42.

In one embodiment, the system consists of a trough in which a screw is mounted. Particles are prevented from settling by induction of sufficient turbulence in the liquid. This turbulence can be created using any suitable method, and is preferably created by the injection of air (or any other gas) into the bottom of the trough, at regular distances along its length. In some embodiments, steam is injected to create turbulence. The air or steam is preferably injected tangentially into the liquid to prevent plugging of the piping by settling solids. In various embodiments, the trough is only filled partially, for example up to the shaft of the screw, to prevent short circuiting of the washing liquid in the upper part of the screw. In other embodiment, as compared to the height of the axis of the screw, the trough is filled to 0.5 to 1.5 the height of the axis, or 0.75 to 1.25 the height of the axis. The open gap between the bottom of the trough and the sides of the screw can be, for example, smaller than 5 centimeters, smaller than 3 centimeters, or smaller than 1 centimeter. The amount of air or steam that is injected to the system can be 20 to 800 $Nm^3/h$, 50 to 600 $Nm^3/h$, or 200 to 500 $Nm^3/h$, calculated per $m^3$ of slurry in the trough. The liquid can be heated by the injection of steam or alternatively by heating the injected air, or by electrically heating or jacket heating the side walls of the trough. The temperature in the washing device can be 20° C. to 95° C., 40° C. and 90° C., or 60° C. to 80° C.

The trough can be equipped with inlet ports for slurry or partially dewatered resin and wash liquor and outlet ports for the washed slurry and the spent wash liquor. The outlet port for the washed slurry can also be equipped with a screw by which partially dewatered resin cake or settled resin can be removed from the washer. In various embodiments, the incoming solids content can be any concentration ranging from a diluted slurry (0.1% total solids on dry weight basis) to a dry powder which then needs to be dispersed in the washing liquid in the screw-type washing unit. The same values given above for the serial CSTR embodiment apply equally to these embodiments.

For the resin that is removed from the screw-type washer, the solids concentration can be 1% to 30%, 5% to 30%, or 10% to 25% if the material needs to be pumped from the washer. If the resin is removed by means of a screw, the cake concentration range can be 25% to 40% or 30% to 40%.

The resin can be prevented from leaving the trough by any port other than the slurry outlet by inserting a fine filter before the spent wash liquid outlet or outlets. This filter can have a mesh of minimum 75 mesh, preferably larger than 150 mesh, or larger than 250 mesh, or the openings in the screens should be smaller than 200 micron, smaller than 100 micron, preferably smaller than 50 micron.

The net flow of wash water in the device is based on the difference in hydrodynamic pressure, and as such the flow of incoming wash liquor, in various embodiments, to be larger than the amount of liquid added to the device through the incoming slurry. The ratio between both water flows should be larger than 1.5, larger than 1.25, or larger than 1.15.

The residence time of the particles is determined by the diffusion rate of the contaminants (for example the acid catalyst) out of the particles and is controlled by the rotational speed of the screw. This residence time can be less than 3 hours, less than 2 hours, or less than 1 hour. This time should be set so as to allow contaminants to diffuse from the particle into the surrounding liquid. The rotational speed is also influenced by the length of the screw and the number of flights per unit length of the shaft.

In any of the continuous washing embodiments of the present invention provided herein, washing effectiveness can be determined by the w/w concentration of contaminants in the resin and in the surrounding liquid, and the amount of washing liquid needed to achieve those concentrations. The latter is expressed in the amount of washing liquid needed to wash 1 kg of poly(vinyl butyral) resin (on dry solids basis), starting from a concentration of contaminants identical to 1 w/w %. The target acid catalyst content in the surrounding liquid can be lower than 100 ppm, lower than 50 ppm, or lower than 20 ppm. The amount of washing liquor needed to achieve this depends on the operation, and specifically on the concentration of solids in the added slurry and the concentration of water at the outlet of the tank. The amount of washing liquor can be less than 20 liter/kg of poly(vinyl butyral), less than 10 liter water/kg of poly(vinyl butyral), or smaller than 5 liter/kg of poly(vinyl butyral).

While the methods of the present invention can be used with a continuous stream of poly(vinyl butyral) resin slurry that was formed using conventional, batch methods, in various embodiments it is preferable to combine the continuous washing capacity of the present invention with a continuous poly(vinyl butyral) resin production method, so that complete continuity from reaction to final washing can be achieved.

A continuous poly(vinyl butyral) production method that can be used in conjunction with the continuous poly(vinyl butyral) washing method of the present invention is described hereinafter.

In one embodiment, a poly(vinyl alcohol) stream, which is poly(vinyl alcohol) that has been dissolved in a suitable solvent, and preferably water, is either heated prior to entering a high shear mixer, as would be the case if the poly(vinyl alcohol) dissolution step is carried out immediately before mixing, or is heated upon entering the mixer. The later embodiment, for example, can be employed if a poly(vinyl alcohol) solution cools between initial dissolution and introduction into the high shear mixer. In either case, the heated poly(vinyl alcohol) stream is mixed with a continuous stream of butyraldehyde in a mixing region of the high shear mixer. An acid catalyst is introduced either before this mixing occurs, as this mixing occurs, or after mixing has already begun but before it is complete. In a screw type high shear mixer, for example, a port for introducing the acid catalyst to the mixing region or to one of the continuous streams can be provided. The combination of the poly(vinyl alcohol) stream, the butyraldehyde stream, and the acid catalyst, along with the high shear mixing, results in the formation of poly(vinyl butyral) resin, which can then be extruded and washed using the method of the present invention.

As used herein, a "high shear mixer" includes any mixer that is capable of introducing the poly(vinyl alcohol) and butyraldehyde streams into a region where a shear rate of at least $20\ s^{-1}$, $30\ s^{-1}$, or $40\ s^{-1}$, or $20\ s^{-1}$ to $400\ s^{-1}$, $20\ s^{-1}$ to $300\ s^{-}$, or $20\ s^{-1}$ to $200\ s^{-1}$ can be applied for a duration of at least 20, 30, or 40 seconds, or 20 to 500 seconds, 20 to 200 seconds, or 20 to 100 seconds. In various embodiments, a shear force of at least 20, 30, or 40 Pascals, or 20 to 400, 20 to 300, or 20 to 200 Pascals is applied. After high sheer mixing, the particle size can be 50 to 200 micros, 60 to 150 microns, or 80 to 120 microns.

High shear mixers include screw extruders, twin screw extruders, in-line mixers (examples include Typhoon® mixers), disintegrators (examples include IKA or Silverson mixers), static mixers (examples include Kenics or Sulzer mixers), and any other device in which a high shear flow field can be combined with a sufficiently long residence time, and preferably combined in a plug flow type flow regime. High shear mixers are capable of continuous production, meaning they are capable of receiving continuous input streams of reactants while also continuously discharging the product of the reaction.

The concentration of butyraldehyde can be 90.0% to 99.9%, 95.0% to 99.9%, or 99.0% to 99.9%. The concentration of the poly(vinyl alcohol) varnish can be 5% to 20%, 8.0% to 18.0%, or 10.0% to 15.0%.

In various embodiments the temperature of the stream of poly(vinyl alcohol) can be greater than 95° C., 105° C., or 115° C., or 120° C. to 160° C., 110° C. to 170° C., or 120° C. to 160° C., and, as noted, the temperature can be set before or after the poly(vinyl alcohol) stream has been introduced into the high shear mixer. Poly(vinyl alcohol) can be derived from any suitable source, and, as described in detail below, in various embodiments the poly(vinyl alcohol) is derived from poly(vinyl acetate) that has been hydrolyzed.

Butyraldehyde is added to the high shear mixer, preferably in a liquid form. Its temperature can range from 0° C. to 70° C., or higher when introduced under pressure, and it can be kept at about room temperature.

The poly(vinyl alcohol) stream is directed to a region of the high shear mixer, which is referred to herein as the "mixing region" of the high shear mixer, in which mixing with a continuous butyraldehyde stream and an acid catalyst will occur. In various embodiments, the temperature of the mixing region is set to be equivalent to the temperature of the incoming poly(vinyl alcohol) stream, or within 10% or 20% of that value.

The acetalization reaction occurs in the presence of acids, acting as a catalyst, in a concentration range, for example between 0.1% and 5% by weight, preferably between 0.2% and 2.0% by weight, based on the aqueous poly(vinyl alcohol) phase. Suitable acids and mixtures thereof are strong mineral acids such as HCl, $H_2SO_4$, $HNO_3$, $HClO_4$, $H_3PO_4$, and other, as well as aromatic and aliphatic sulfuric acids. The temperature of the acid can range between 20° C. and 100° C., and is preferably within 10 degrees Celsius or exactly equal to the temperature of the poly(vinyl alcohol) solution. In various embodiments, the acid catalyst is an inorganic acid, and, in preferred embodiments, the acid catalyst is nitric acid.

The amount of butyraldehyde that is added can be 0.25 kg to 1.5 kg or 0.50 kg to 0.75 kg for each 1 kg of pure poly(vinyl alcohol) added.

In some embodiments, two distinct mixing regions are included in the high shear mixer. In a first mixing region, the poly(vinyl alcohol) and butyraldehyde are mixed in a high shear region. In the first mixing region the shear rate ranges from 20 $s^{-1}$ to 10,000 $s^{-1}$, from 50 and 5000 $s^{-1}$, or from 100 and 500 $s^{-1}$. The residence time of the material in this first mixing region can be between 10 seconds and 60 minutes, 30 seconds and 30 minutes, or 60 seconds and 10 minutes. In a second mixing region, the shear rate can be decreased to values from 1 $s^{-1}$ and 500 $s^{-1}$ or from 5 and 50 $s^{-1}$. The residence time in the second mixing region can be 10 minutes to 180 minutes or 20 minutes to 60 minutes. The temperature in each mixing region can be the same or different in these embodiments. The temperature in the first mixing region can be 10° C. to 120° C. or from 40° C. to 100° C. The temperature in the second mixing region can be 10° C. to 120° C. or 60° C. to 120° C.

As used herein, "processing said poly(vinyl butyral) resin from said high shear mixer" means using any suitable means to cause the poly(vinyl butyral) resin to be removed from the high shear mixer, including, for example, but not limited to, forcing the resin out of the mixer using mixer pressure or external pressure, among others.

Various additives can be added to the poly(vinyl butyral) resin during the above-described mixing process. These can be surfactants to help control the size distribution of the particles and to counteract excessive agglomeration of the particles (see U.S. Pat. No. 5,238,994) or long chain aldehydes to form longer chain acetal groups on the polymer backbone, which could serve as internal plasticization (see U.S. Pat. No. 5,594,069).

The poly(vinyl butyral) resin produced by the continuous washing process of the present invention can be, after formation of the resin in the mixing region of the high shear mixer, amended in the same continuous process with further additives and plasticizers and formed into pellets that can be easily stored and handled, as described in detail in U.S. Pat. No. 7,491,761.

Poly(vinyl butyral) formed by the methods of the present invention can be formed into any article for which it is suitable. In one common application poly(vinyl butyral) is used for the production of polymer sheets for use in, for example, automobile and architectural safety glass, and photovoltaic modules.

As used herein, a "polymer sheet" means any thermoplastic polymer composition formed by any suitable method into a thin layer that is suitable alone, or in stacks of more than one layer, for use as an interlayer that provides adequate penetration resistance and glass retention properties to laminated glazing panels.

The present invention includes, in addition to the methods described herein, the polymer resin made by the inventive process and any articles made therefrom, including poly(vinyl butyral) sheets and laminated glazings and photovoltaic modules made from the resin or the sheet.

Details for the various parameters of the reactants of the methods of the present invention are detailed in U.S. Pat. Nos. 2,282,057 and 2,282,026 and in Vinyl Acetal Polymers, in Encyclopedia of Polymer Science & Technology, $3^{rd}$ edition, Volume 8, pages 381-399, by B. E. Wade (2003).

In various embodiments, the poly(vinyl butyral) resin produced by the methods of the present invention comprises 10 to 35 weight percent (wt. %) hydroxyl groups calculated as poly(vinyl alcohol), 13 to 30 wt. % hydroxyl groups calculated as poly(vinyl alcohol), or 15 to 22 wt. % hydroxyl groups calculated as poly(vinyl alcohol). The poly(vinyl butyral) resin can also comprise less than 15 wt. % residual ester groups, 13 wt. %, 11 wt. %, 9 wt. %, 7 wt. %, 5 wt. %, or less than 3 wt. % residual ester groups calculated as poly(vinyl acetate), with the balance being an acetal, preferably butyraldehyde acetal, but optionally including other acetal groups in a minor amount, e.g., a 2-ethyl hexanal group (see, for example, U.S. Pat. No. 5,137,954).

In various embodiments the poly(vinyl butyral) produced can have a molecular weight of at least 30,000, 40,000, 50,000, 55,000, 60,000, 65,000, 70,000, 120,000, 250,000, or at least 350,000 grams per mole (g/mole or Daltons). Small quantities of a dialdehyde or trialdehyde can also be added during the acetalization step to increase molecular weight to at least 350,000 g/mole (see, for example, U.S. Pat. Nos. 4,902,464; 4,874,814; 4,814,529; and, 4,654,179). As used herein, the term "molecular weight" means the weight average molecular weight.

Various adhesion control agents can be added to the poly(vinyl butyral) of the present invention, including sodium acetate, potassium acetate, and magnesium salts. Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate)(chemical abstracts number 79992-76-0). In various embodiments of the present invention the magnesium salt is magnesium bis(2-ethyl butyrate) and magnesium bis(2-ethyl hexanoate).

Other additives may be incorporated into the poly(vinyl butyral) to enhance its performance in a final product. Such additives include, but are not limited to, dyes, pigments, stabilizers (e.g., ultraviolet stabilizers), antioxidants, IR absorbers, flame retardants, combinations of the foregoing additives, and the like, as are known in the art.

Any suitable plasticizers can be added to the poly(vinyl butyral) resins of the present invention. Plasticizers can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779, and $C_6$ to $C_8$ adipate esters, such as hexyl adipate. In various embodiments, the plasticizer used is dihexyl adipate and/or triethylene glycol di-2 ethylhexanoate.

In various embodiments of the present invention, poly(vinyl butyral) that has been mixed with plasticizer, for example in sheet or pellet form, can comprise 20 to 60, 25 to 60, 20 to 80, 10 to 70, or 10 to 100 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

The amount of plasticizer can be adjusted to affect the glass transition temperature ($T_g$) of the poly(vinyl butyral) product. In general, higher amounts of plasticizer are added to decrease the $T_g$. Poly(vinyl butyral) polymer sheets of the present invention, for example, can have a $T_g$ of 40° C. or less, 35° C. or less, 30° C. or less, 25° C. or less, 20° C. or less, and 15° C. or less.

Any suitable method can be used to produce polymer sheets of the present invention from resins of the present invention. One exemplary method of forming a poly(vinyl butyral) sheet comprises extruding molten poly(vinyl butyral) comprising resin, plasticizer, and additives by forcing the melt through a die (for example, a die having an opening that is substantially greater in one dimension than in a perpendicular dimension). Another exemplary method of forming a poly(vinyl butyral) sheet comprises casting a melt from a die onto a roller, solidifying the resin, and subsequently removing the solidified resin as a sheet. In various embodiments, the polymer sheets can have thicknesses of, for example, 0.1 to 2.5 millimeters, 0.2 to 2.0 millimeters, 0.25 to 1.75 millimeters, and 0.3 to 1.5 millimeters.

A reactor system may be positioned after the high shear mixer. The reactor system can be any type of device that allows a continuous flow of slurry through the system that provides sufficient shear and that can sufficiently control temperature. Examples are plug flow reactors, such as an oscillating pipe reactor, a series of static (for example, Kenics®) mixers connected to one another to provide a sufficiently long residence time, or a multiple chamber mixer that has adjacent chambers, each with an agitator, where the poly(vinyl butyral) is alternatingly passed to each chamber in a port on the bottom of a chamber and a port on the top of a chamber. A continuous stirred tank reactor can also be effectively employed.

EXAMPLES

Example 1

Four continuously stirred and jacketed vessels with baffles each with a capacity of 200 liters are provided. Each is equipped with an impeller driven by a 1 kW motor. Filtration in each vessel is accomplished with a retractable probe (pipe) with a filter sock at the end. The filter cloth is 5 micron poly(propylene). Poly(vinyl butyral) slurry at 19% w/w solids concentration and a flow rate of 4.5 liters/minute is fed to the first CSTR. Fresh wash water is introduced in the fourth CSTR at a rate of 7.5 liters per minute to give a wash water to resin ratio of 8.9. Slurry and wash liquor flow rates between CSTRs are adjusted to maintain nearly constant levels in all four vessels. A 45% w/w solution of potassium hydroxide is introduced to the third CSTR at a flow rate of 1 cc/min to neutralize any residual nitric acid. Liquor samples are collected before and after washing, as well as at intermediate points for nitrates measurement. Slurry feed to the $1^{st}$ CSTR is at 95° C. Temperatures in the first, second, third, and fourth CSTRs are maintained at 75° C., 60° C., 50° C. and 35° C. via jacket heating or cooling. The temperature is decreased progressively towards the last CSTR so that the slurry is sufficiently cold for the processing step following the washing. Particles that are too hot can agglomerate during filtration or centrifugation. Two runs on this setup produce final poly(vinyl butyral) resin with yellowness index of 15.5 and haze of 4.9 and yellowness index of 6 and haze of 5.4. The latter is within A-grade specifications of commercial aqueous Butvar® resin.

Example 2

A trough of 2.5 m by 0.5 m in diameter is provided. The trough has injection ports for air along the entire length of the shaft. The amount of air that is injected is controlled locally at each point by means of a manual valve. Steam is injected at four different locations. Temperature in the washing device ranges from 50° C. at the inlet of the demineralized water to 80° C. in the middle of the system. The screw has 18 sections along the entire length. The flight surfaces have holes that are covered with screens of woven metal of 325 mesh. This allows the wash water to pass through the mesh while particles are pushed forward upon rotation of the screw. The rotation speed can be adjusted so that the residence time of the particles can be controlled to be between 1 and 3 hours. Using this device, poly(vinyl butyral) particles can be washed with an amount of wash water that is less than 10 liter/kg poly(vinyl butyral). The incoming poly(vinyl butyral) slurry has a pH lower than one, while five sections downstream of the inlet port the pH is seven. This indicates that countercurrent flow works successfully. The washing efficiency is such that the particles after washing (residence time approximately 90 minutes) contain less than 50 ppm of nitrates, while the incoming slurry contains more than 10,000 ppm of nitrates.

By virtue of the present invention, it is now possible to continuously wash high quality poly(vinyl butyral) resin that can be used in any conventional poly(vinyl butyral) application.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, and that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout, thereby forming many permutations that are within the scope of the present invention but that would be cumbersome to list.

Any figure reference numbers given within the abstract or any claims are for illustrative purposes only and should not be construed to limit the claimed invention to any one particular embodiment shown in any figure.

Figures are not drawn to scale unless otherwise indicated.

Each reference, including journal articles, patents, applications, and books, referred to herein is hereby incorporated by reference in its entirety.

We claim:

1. A method of continuously washing a poly(vinyl butyral) resin, comprising the steps:
   providing a first continuous stirred tank reactor;
   providing a second continuous stirred tank reactor;
   adding a continuous stream of poly(vinyl butyral) slurry to said first continuous stirred tank reactor;
   washing said continuous stream of poly(vinyl butyral) slurry in said first continuous stirred tank reactor to form a once washed poly(vinyl butyral) slurry;
   moving said once washed poly(vinyl butyral) slurry to said second continuous stirred tank reactor;
   washing said once washed poly(vinyl butyral) slurry in said second continuous stirred tank reactor to form a twice washed poly(vinyl butyral) slurry; and,
   removing said twice washed poly(vinyl butyral) slurry from said second continuous stirred tank reactor.

2. The method of claim 1, further comprising moving said twice washed poly(vinyl butyral) through two to nine more continuous stirred tank reactors.

3. The method of claim 1, further comprising moving said twice washed poly(vinyl butyral) through up to thirteen more continuous stirred tank reactors.

4. The method of claim 1, wherein water is used for said washing.

5. The method of claim 1, wherein said first continuous stirred tank reactor or said second continuous stirred tank reactor or both comprise a screen attached to the bottom or side walls, a screen barrels installed inside the tank, a top-inserted filter sock, or a filter installed in an external loop.

6. The method of claim 1, wherein said first continuous stirred tank reactor is operated at a temperature between 20° C. and 95° C. and said second continuous stirred tank reactor is operated at a temperature of 20° C. and 95° C.

7. The method of claim 1, wherein said first continuous stirred tank reactor is operated at a temperature of 20° C. and 95° C. and said second continuous stirred tank reactor is operated at a temperature of 20° C. and 95° C.

8. The method of claim 1, wherein said continuous stream of poly(vinyl butyral) slurry is provided at a rate of 0.1 to 5 liters per second.

9. The method of claim 1, wherein said poly(vinyl butyral) slurry has a total solids concentration of 15-25%.

10. The method of claim 1, wherein the final washed polyvinyl butyral slurry has an acid catalyst content in the liquid portion of less than 100 ppm.

11. A method of continuously washing a poly(vinyl butyral) resin, comprising the steps:
    providing a counter current, continuous screw wash unit, wherein said counter current, continuous screw wash unit comprises a trough with a screw located therein;
    adding a continuous stream of poly(vinyl butyral) slurry to said counter current, continuous screw wash unit;
    washing said continuous stream of poly(vinyl butyral) slurry in said counter current, continuous screw wash unit by passing a constant stream of wash fluid through said poly(vinyl butyral) slurry in a direction opposite to the flow of said poly(vinyl butyral) slurry to form a washed poly(vinyl butyral) slurry; and,
    removing said washed poly(vinyl butyral) slurry from said counter current, continuous screw wash unit.

12. The method of claim 11 wherein said wash fluid is water.

13. The method of claim 11, wherein said screw has screens.

14. The method of claim 11, wherein said screw defines small holes that allow the passage of wash fluid.

15. The method of claim 11, further comprising agitating said poly(vinyl butyral) slurry by injecting air into said trough.

16. The method of claim 15, wherein said air is injected at 20 to 800 $Nm^3/h$.

17. The method of claim 11, further comprising agitating said poly(vinyl butyral) slurry by injecting steam into said trough.

18. The method of claim 11, further comprising heating said poly(vinyl butyral) slurry by using heated air injection, jacketed heating, or electrical heating.

19. The method of claim 18, wherein said poly(vinyl butyral) slurry is heated to 20° C. to 95° C.

20. The method of claim 11, wherein said continuous stream of poly(vinyl butyral) slurry is provided at a rate of 0.1 to 5 liters per second.

21. The method of claim 11, wherein said poly(vinyl butyral) slurry has a total solids concentration of 15-25%.

22. The method of claim 11, wherein the final washed polyvinyl butyral slurry has an acid catalyst content in the liquid portion of less than 100 ppm.

* * * * *